United States Patent
Mungas et al.

(10) Patent No.: US 9,713,905 B2
(45) Date of Patent: Jul. 25, 2017

(54) CARBON-ON-CARBON MANUFACTURING

(71) Applicant: Firestar Engineering, LLC, Mojave, CA (US)

(72) Inventors: Gregory S. Mungas, Mojave, CA (US); Larry Buchanan, Pomona, CA (US); Jose T. Banzon, Jr., Glendale, CA (US)

(73) Assignee: Carol Mungas, Sun City, AZ (US)

( * ) Notice: Subject to any disclaimer, the term of this patent is extended or adjusted under 35 U.S.C. 154(b) by 0 days.

(21) Appl. No.: 14/325,213

(22) Filed: Jul. 7, 2014

(65) Prior Publication Data
US 2015/0079382 A1    Mar. 19, 2015

Related U.S. Application Data

(62) Division of application No. 13/754,604, filed on Jan. 30, 2013, now abandoned.
(Continued)

(51) Int. Cl.
*C23C 16/00* (2006.01)
*B29C 70/02* (2006.01)
(Continued)

(52) U.S. Cl.
CPC ........ *B29C 70/021* (2013.01); *B29C 35/0222* (2013.01); *C04B 35/83* (2013.01); *C04B 41/009* (2013.01); *C04B 41/5057* (2013.01); *C04B 41/5059* (2013.01); *C04B 41/515* (2013.01); *C04B 41/87* (2013.01); *C04B 41/88* (2013.01); *B29K 2105/0809* (2013.01);
(Continued)

(58) Field of Classification Search
CPC .......................... B29C 70/021; B29C 35/0222; C04B 41/009; C04B 41/87; C04B 41/88; C04B 41/5057; C04B 41/5059; C04B 41/515; C04B 35/83; C04B 2235/425; C04B 2235/616; C04B 2235/65; C04B 2235/5264; C04B 2235/5256; C04B 2235/608; C04B 2235/614; C04B 2235/6581; Y10T 428/249921; D10B 2101/12; B29K 2307/04; B29K 2105/0809
USPC .......................... 427/249.1–255.7
See application file for complete search history.

(56) References Cited

U.S. PATENT DOCUMENTS

| | | | | |
|---|---|---|---|---|
| 4,100,322 A | * | 7/1978 | Seibold | B29C 70/04 264/29.5 |
| 4,215,161 A | * | 7/1980 | Seibold | B29C 70/04 264/29.5 |

(Continued)

OTHER PUBLICATIONS

MSDS EPON RESIN 1031, http://www.chemcas.com/msds112/cas/3412/7328-97-4_122-60-1_106-89-8.asp, accessed online Jan. 7, 2016.*

*Primary Examiner* — Michael Wieczorek
*Assistant Examiner* — Michael G Miller
(74) *Attorney, Agent, or Firm* — Holzer Patel Drennan (57) ABSTRACT

The presently disclosed technology relates to carbon-on-carbon (C/C) manufacturing techniques and the resulting C/C products. One aspect of the manufacturing techniques disclosed herein utilizes two distinct curing operations that occur at different times and/or using different temperatures. The resulting C/C products are substantially non-porous, even though the curing operation(s) substantially gasify a liquid carbon-entrained filler material that saturates a carbon fabric that makes up the C/C products.

17 Claims, 4 Drawing Sheets

Related U.S. Application Data (60) Provisional application No. 61/592,143, filed on Jan. 30, 2012.

(51) Int. Cl.
*B29C 35/02* (2006.01)
*C04B 35/83* (2006.01)
*C04B 41/87* (2006.01)
*C04B 41/88* (2006.01)
*C04B 41/00* (2006.01)
*C04B 41/50* (2006.01)
*C04B 41/51* (2006.01)
*B29K 105/08* (2006.01)
*B29K 307/04* (2006.01)

(52) U.S. Cl.
CPC .... *B29K 2307/04* (2013.01); *C04B 2235/425* (2013.01); *C04B 2235/5256* (2013.01); *C04B 2235/5264* (2013.01); *C04B 2235/608* (2013.01); *C04B 2235/614* (2013.01); *C04B 2235/616* (2013.01); *C04B 2235/65* (2013.01); *C04B 2235/6581* (2013.01); *C04B 2235/661* (2013.01); *D10B 2101/12* (2013.01); *Y10T 428/249921* (2015.04)

(56) References Cited

U.S. PATENT DOCUMENTS

| | | | | |
|---|---|---|---|---|
| 4,659,624 A * | 4/1987 | Yeager | ............... | B29C 70/086 156/245 |
| 5,334,414 A * | 8/1994 | Edie | ............... | B05C 19/04 264/29.2 |
| 5,418,063 A * | 5/1995 | Booth | ............... | C04B 35/83 427/113 |
| 5,439,627 A * | 8/1995 | De Jager | ............... | B22F 1/0059 264/129 |
| 5,525,558 A * | 6/1996 | Niwa | ............... | C04B 35/83 156/242 |
| 6,521,296 B1 * | 2/2003 | Seal | ............... | B29C 70/44 264/257 |
| 7,332,112 B1 * | 2/2008 | Shivakumar | ............... | C04B 35/83 264/29.3 |
| 2009/0133788 A1 | 5/2009 | Mungas et al. | | |
| 2010/0031626 A1 | 2/2010 | Oehrlein | | |
| 2012/0299216 A1 | 11/2012 | Carnahan et al. | | |

\* cited by examiner

CARBON-ON-CARBON MANUFACTURING

CROSS-REFERENCE TO RELATED APPLICATIONS

The present application is a divisional application under 35 U.S.C. §121 of U.S. patent application Ser. No. 13/754,604 filed Jan. 30, 2013 and titled "CARBON-ON-CARBON MANUFACTURING" which claims benefit of priority to U.S. Provisional Patent Application No. 61/592,143, entitled "Carbon-on-Carbon Manufacturing" and filed on 30 Jan. 2012, both of which are specifically incorporated by reference herein for all they disclose or teach.

GOVERNMENT LICENSE RIGHTS

This invention was made with government support under one or more of W31P4Q-09-C-0314 awarded by the Defense Advanced Research Projects Agency (DARPA), NNX11CG14P awarded by the National Aeronautics and Space Administration (NASA), and NNX11CA36C also awarded by NASA. The government has certain rights in the invention.

BACKGROUND

Carbon fiber-reinforced carbon (i.e., carbon-on-carbon, carbon-carbon, or C/C) is a composite material made of a carbon fiber fabric reinforced in a carbon matrix. C/C is a material that can tolerate high temperatures and can be optimized for desired thermal properties, depending on the specific composition of the C/C. Further, C/C materials are structurally stable to very high temperatures (e.g., greater than 2000-3000° C.) and are generally insensitive to thermal shock. As a result, C/C materials are particularly well suited to structural applications at high temperatures or where thermal shock resistance and/or a low coefficient of thermal expansion is desired.

SUMMARY

Implementations described and claimed herein address the foregoing problems by providing a method of manufacturing a carbon-on-carbon (C/C) composite, the method comprising curing a C/C lay-up within a mold under vacuum at a first curing temperature, releasing the C/C lay-up from the mold, and curing the C/C lay-up at a second curing temperature responsive to the releasing operation, wherein the second curing temperature is higher than the first curing temperature.

Implementations described and claimed herein address the foregoing problems by further providing a carbon-on-carbon (C/C) lay-up comprising one or more layers of carbon fabric, each layer substantially saturated with carbon-entrained filler, a releasing layer positioned between the saturated carbon fabric and a mold, and a breather layer positioned over the saturated carbon fabric, wherein the breather layer receives a vaporized liquid component of the carbon-entrained filler from the C/C lay-up when the C/C lay-up is cured during a first curing operation at a first curing temperature and a second curing operation at a second curing temperature, wherein the second curing temperature is higher than the first curing temperature.

Implementations described and claimed herein address the foregoing problems by still further providing a carbon-on-carbon (C/C) product comprising one or more layers of carbon fabric bonded with carbon powder from a gasified carbon-entrained filler material, the C/C product without significant porosity from the gasified carbon-entrained filler material.

Other implementations are also described and recited herein.

DETAILED DESCRIPTIONS

C/C is often manufactured using three main steps. First, a fabric of carbon fibers is laid in its intended shape onto a relatively expensive, high-temperature mold (e.g., a ceramic mold) and surrounded by a carbon-entrained epoxy, plastic, or pitch binder mixture. The carbon fabric, molded on the mold and surrounded by the binder is referred to herein as a lay-up. Often coke or some other fine carbon aggregate is added to the binder mixture. Second, the lay-up is heated to very high temperature (e.g., 1500-3000° C.), so that pyrolysis (thermochemical decomposition) transforms the binder to relatively pure carbon. The binder outgasses during pyrolysis and undesirable voids are formed in the lay-up. Third, forcing a carbon-forming gas such as acetylene through the lay-up at high temperatures (known as carbon vapor deposition or CVD), typically over the course of several days, gradually fills the voids with carbon. This process is typically time consuming and involves high temperatures, both of which are contributors to the typically high cost of manufacturing C/C. The presently disclosed technology allows the manufacture of C/C without the aforementioned third time-consuming and expensive step traditionally used in the manufacture of C/C. Further, since the presently disclosed technology employs a lower temperature process in manufacturing C/C, the process is simplified and results in a reduction in cost.

Figure 1:
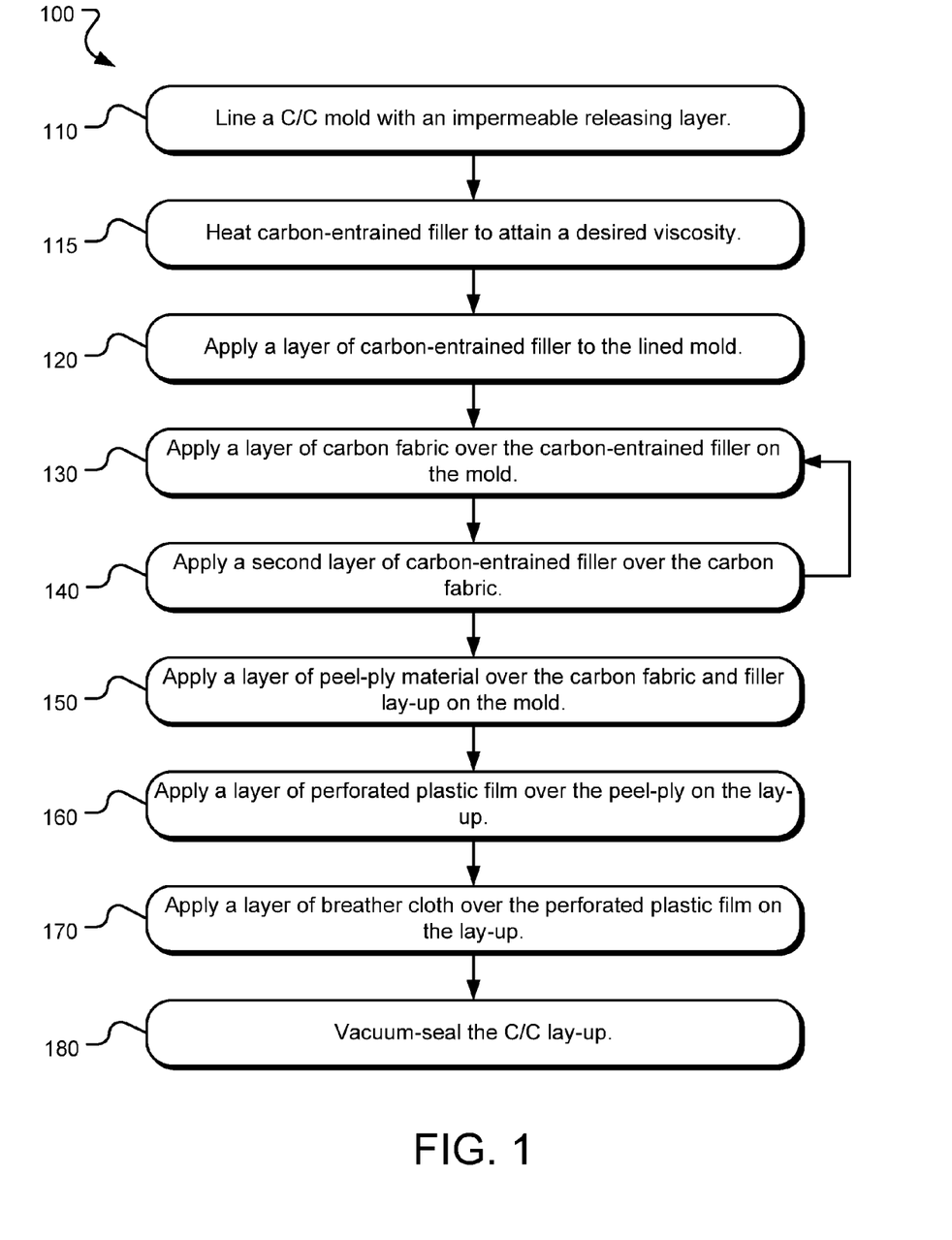
FIG. 1 illustrates example operations for making a C/C lay-up according to the presently disclosed technology.

FIG. 1 illustrates example operations 100 for making a C/C lay-up according to the presently disclosed technology. A lining operation 110 lines a C/C mold with an impermeable or mostly impermeable releasing layer (e.g., acetate tape). The C/C mold is typically made of a metallic (e.g., aluminum or steel), ceramic, or other solid material capable of maintaining its shape at outgassing temperatures (e.g., 230-315° C.). The C/C mold is fashioned in the intended shape of a C/C product to be manufactured using the mold. The releasing layer prevents the C/C lay-up from bonding to the mold during curing of the C/C product, thus allowing the C/C lay-up to be removed from the mold during and/or after curing of the C/C product. A heating operation 115 heats a volatile carbon-entrained filler to attain a desired viscosity (e.g., at 90-100° C.).

The carbon-entrained filler includes a carbon powder suspended in a viscous entraining liquid (e.g., a fluid able to flow and take the shape of a container). In one implementation, the carbon powder has an average granule size of less than about 10 microns in average particle diameter. In another implementation, the carbon powder has an average granule size of less than about 1000 or 100 microns in average particle diameter. In yet another implementation, the carbon powder includes particles that are less than about 0.1 micron in average particle diameter. In still another implementation, a wide distribution of carbon powder particle sizes is included in the carbon-entrained filler to allow for high density particle packing. The entraining liquid may have a high vapor pressure (e.g., higher than 1 atm) at temperatures in the 150-315° C. range. This allows the entraining liquid to be substantially outgassed before substantial diffusion bonding of the carbon powder and the carbon fabric occurs. The carbon-entrained filler does not significantly penetrate through the releasing layer to the mold and is thus prevented from bonding with the mold. Further, the carbon-entrained filler does not bond well with the releasing layer.

An example carbon-entrained filler may include graphite as the powdered carbon at up to 50% of the filler by mass. The example carbon-entrained filler may further include isopropanol at up to 70% of the filler by mass, which acts as a fluid suspension media. The example carbon-entrained filler may further still include phenolic resin at up to 50% of the filler by mass, which may be used as a weak bonding agent during a first curing operation (see e.g., operation 210 of FIG. 2). In some implementations, the phenolic resin is reduced to a minimum sufficient to provide a weak bond during the first curing operation (e.g., about 1%). In other implementations, higher concentrations of phenolic resin are used for mold structures that are more difficult to release (e.g., molds with shallow draft angles, molds with large contract surfaces areas, etc.). A higher green curing strength associated with higher concentrations of phenolic resin may help facilitate removal of the green-cured C/C lay-up from its mold without inducing localized cracking or other structural micro-failures during removal of the green-cured C/C lay-up from its mold. The phenolic resin may further function to act as a dispersant to coat the carbon powder and help prevent clumping of the carbon powder within the filler. The example carbon-entrained filler may have a boiling point of about 170° C.

Another example carbon-entrained filler may include terraazatricyclodecane as an example high vapor pressure substance that entrains other organic compounds present in the filler. In other implementations, a lower vapor pressure fluid may be used to entrain the organic compounds present in the carbon-entrained filler. However, the lower vapor pressure fluid may not as readily boil off under a vacuum, slowing the vaporization of the entraining fluid.

In an example implementation, the terraazatricyclodecane is 57% of the carbon-entrained filler by mass. The example carbon-entrained filler may further include carbon powder at 16-24%, but may range up to 35% of the filler by mass. The carbon-entrained filler may further include a phenolic resin at 11-16%, but may range up to 25% of the filler by mass. The phenolic resin may function as a suspension for the various powders within the filler. The carbon-entrained filler may further include a trans oil at 2-3%, but may range up to 5% of the filler by mass. The trans oil functions to coat individual particles within the filler and act as a dispersant of the filler constituent material. Other dispersants may also be used in the carbon-entrained filler to prevent settling or clumping of the carbon powder. The carbon-entrained filler may further include hexamethylenetetramene at 2%, but may range up to 4% of the filler by mass. The hexamethylenetetramene has a similar function as terraazatricyclodecane, but is included in a powdered solid form rather than a liquid form. The carbon-entrained filler may further include isopropanol at up to 30% of the filler by mass. The isopropanol may act as a thinner for the carbon-entrained filler.

The carbon-entrained filler may also include one or more of acetone at up to 30% of the filler by mass, furfuryl alcohol at up to 25% of the filler by mass, ethanol at up to 5% of the filler by mass, and toluene at up to 5% of the filler by mass. The acetone, furfuryl alcohol, ethanol, and/or toluene may act as a fluid suspension media. The carbon-entrained filler may further include formaldehyde at up to 1% of the filler by mass, which may act as surfactant. The carbon-entrained filler may further still include phenolic resin at 2-5% of the filler by mass, which may act as a weak bonding agent during a first curing operation (see e.g., curing operation 210 of FIG. 2) and may support C/C bonding during a second curing operation (see e.g., curing operation 240 of FIG. 2), where pyrolysis primarily occurs.

Carbon-entrained fillers with high concentrations of carbon particles may be very viscous and/or have very low surface tensions. In one implementation, the desired viscosity of the carbon-entrained filler has low enough viscosity to enable the carbon-entrained filler to fully permeate and wet a carbon fabric (i.e., completely or nearly completely penetrating and filling gaps within the carbon fabric), but viscous enough to remain entrained within the carbon fabric while the C/C product is manufactured (e.g., 0.1 cP to 10,000 cP). Further, the surface tension of the liquid component of the carbon-entrained filler is sufficient to fully draw the carbon-entrained filler into the carbon fabric (e.g., greater than about 5 millinewtons per meter). In some implementations, the heating operation 115 is not performed. In some implementations, lower surface tension and/or higher viscosity carbon-entrained fillers may be applied to the carbon fabric using fluid pressure to help facilitate the carbon-entrained filler fully permeating and wetting the carbon fabric.

A first applying operation 120 applies a layer of the carbon-entrained filler to the lined mold. A second applying operation 130 applies a layer of carbon fabric over the carbon-entrained filler on the mold. In some implementations, the first applying operation 120 is not performed and the carbon fabric is directly applied to the mold in the second applying operation 130.

The carbon (i.e., carbon fiber, carbon graphite, or CF) fabric is a material made of carbon fibers (e.g., 5-10 µm in diameter) composed of mostly carbon atoms (greater than 90%). The carbon atoms within the carbon fabric are bonded together in crystals that are mostly aligned parallel to a long axis of each carbon fiber. The crystal alignment gives the carbon fiber a high strength-to-volume ratio. Many (e.g., several thousand) carbon fibers are twisted together to form a carbon yarn, which may be woven to form the carbon fabric. In other implementations, individual carbon fibers are interwoven to make the carbon fabric. The resulting carbon fabric is flexible, has a high tensile strength, low weight, high temperature tolerance, and low thermal expansion rates. The carbon fabric adheres to and intermixes with the carbon-entrained filler on the mold and is compressed onto the mold so that it takes the shape of the mold.

A third applying operation 140 applies a second layer of carbon-entrained filler over the carbon fabric. As a result, the carbon fabric is surrounded on both sides and saturated with the carbon-entrained adhesive. In some implementations, the carbon-entrained filler is only applied to one side of the carbon fabric and the filler permeates through the carbon fabric to fully saturate the carbon fabric. Further, the applying operations 130, 140 may be repeated to apply as many layers of carbon fiber and filler on the mold as desired.

In various implementations, the applying operations 120, 130, 140 may be performed by hand or automated. Further, the layers of carbon fabric may be pre-pregnated with carbon-entrained filler, such that the applying operations 120, 140 are not necessary. In other implementations the carbon fabric layers may be applied to the mold without the carbon-entrained filler. The carbon-entrained filler is then injected under pressure into the lay-up. In yet other implementations, the carbon fabric is a matrix of chopped up and randomized fibers entrained within the carbon-entrained filler material. The carbon fabric entrained filler material is then spread over the mold.

A fourth applying operation 150 applies a layer of peel-ply material over the carbon fabric and filler lay-up on the mold. The peel-ply is an open-weave material (e.g., fiberglass, polyester, or heat-set nylon) that allows excess filler and gasses generated from the filler (e.g., during curing operations 210, 240 of FIG. 2) to penetrate through the peel-ply. However, the peel-ply does not readily adhere to the underlying carbon fabric and filler lay-up.

A fifth applying operation 160 applies a layer of perforated plastic film over the peel-ply on the lay-up. The perforated plastic film is a thin layer of flexible plastic (e.g., polypropylene) with tiny regularly spaced holes that allow the excess carbon-entrained filler and gasses generated from the filler to penetrate through the perforated plastic film. The size and spacing of the holes in the perforated plastic film controls the rate and quantity of excess carbon-entrained filler and gasses generated from the filler to exit the lay-up through the peel-ply. For example, the hole size is large enough relative to the carbon-entrained filler viscosity to allow excess filler material to permeate through the perforated plastic film without being so large as to allow significant bonding of the carbon-entrained carbon fabric to overlying breather cloth (see operation 170) through the perforated plastic film. The hole spacing is small enough to prevent granularity or pixilation of the carbon-entrained carbon fabric underlying the perforated plastic film and large enough to allow a desired rate of the excess filler material to permeate through the perforated plastic film.

A sixth applying operation 170 applies a layer of breather cloth over the perforated plastic film on the lay-up. The breather cloth (e.g., a cotton fabric) absorbs the excess carbon-entrained filler and gasses generated from the filler that penetrate through the perforated plastic film. Without the perforated plastic film applied in operation 160, too much of the carbon-entrained filler may be withdrawn from the lay-up via the breather cloth.

A vacuum sealing operation 180 applies a vacuum seal over the entire lay-up. In an example implementation, a flexible vacuum membrane or bag, which may be made of a reusable silicone or extruded polymer film, covers the lay-up. Further, the vacuum bag may be made of a strong rubber-coated fabric or a polymer (polyurethane or vinyl) film. The vacuum membrane or bag may enclose the entire lay-up or it may form only an exterior face or faces of the lay-up with the vacuum membrane or bag being single sided to seal the outer face of the lay-up to the mold. Any open ends of the vacuum membrane or bag are sealed and air is drawn through the vacuum membrane or bag through a fitting on the vacuum membrane or bag.

More specifically, a vacuum is applied to the interior volume or surface(s) of the vacuum membrane or bag with ambient atmospheric pressure acting on the exterior volume or surface(s) of the vacuum membrane or bag. In one implementation, the vacuum is applied using a venturi vacuum, an air compressor, and/or a vacuum pump. As a result, uniform pressure at approximately one atmosphere is applied to the exterior surface(s) of the lay-up covered by the vacuum membrane or bag. A similar process using a pressure bag, which operates by applying positive pressure from an underside of the lay-up, used in conjunction with a corresponding female mold on top of the lay-up may be used in lieu of the vacuum membrane or bag.

In various implementations, if the releasing layer is essentially impermeable, the vacuum on the interior volume or surface(s) of the vacuum membrane or bag can be readily maintained without additional vacuum pumping. In other implementations, if the releasing layer has a measurable permeability, additional vacuum pumping may be required to maintain vacuum pressure on the interior volume or surface(s) of the vacuum membrane or bag. Additional processes may utilize physical compressive force in additional or in lieu of vacuum pressure to apply pressure on the lay-up. Physical compressive force may be used when vacuum pressure applies insufficient force on the lay-up.

Figure 2:
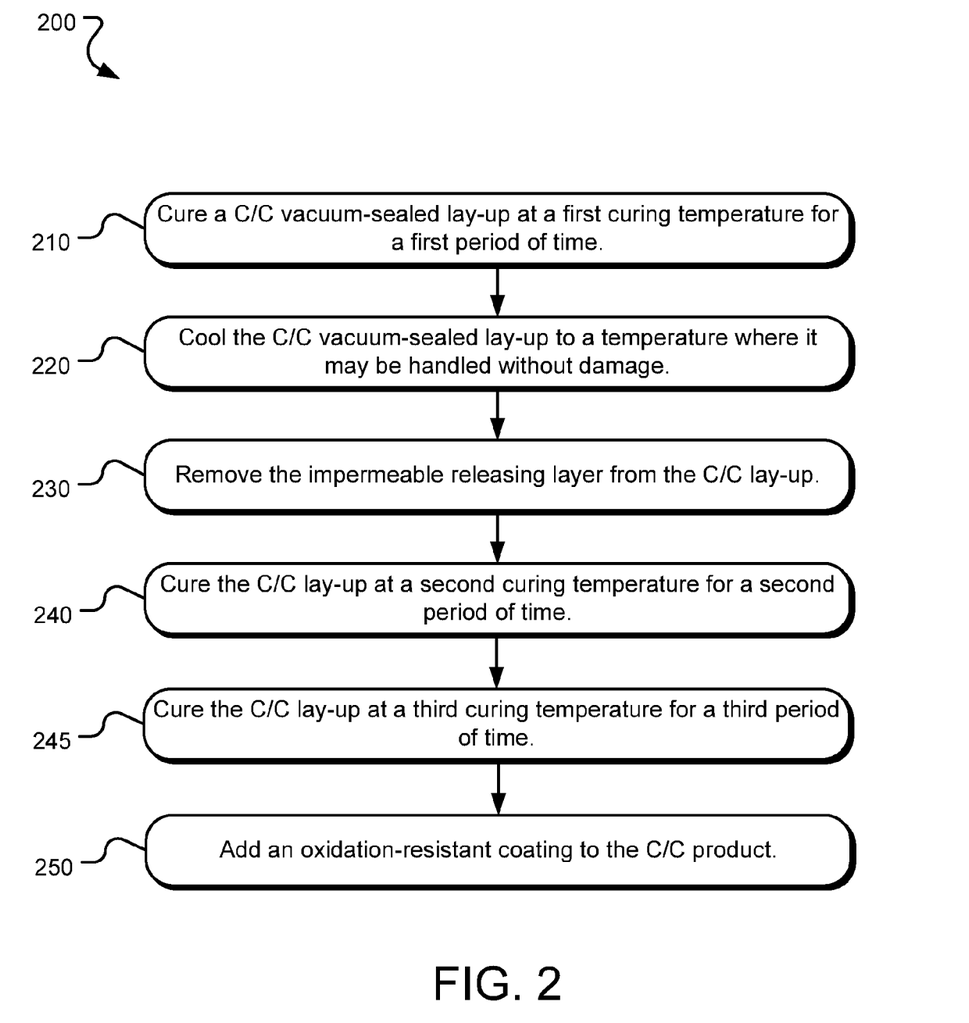
FIG. 2 illustrates example operations for making a C/C product using a C/C lay-up.
Figure 3:
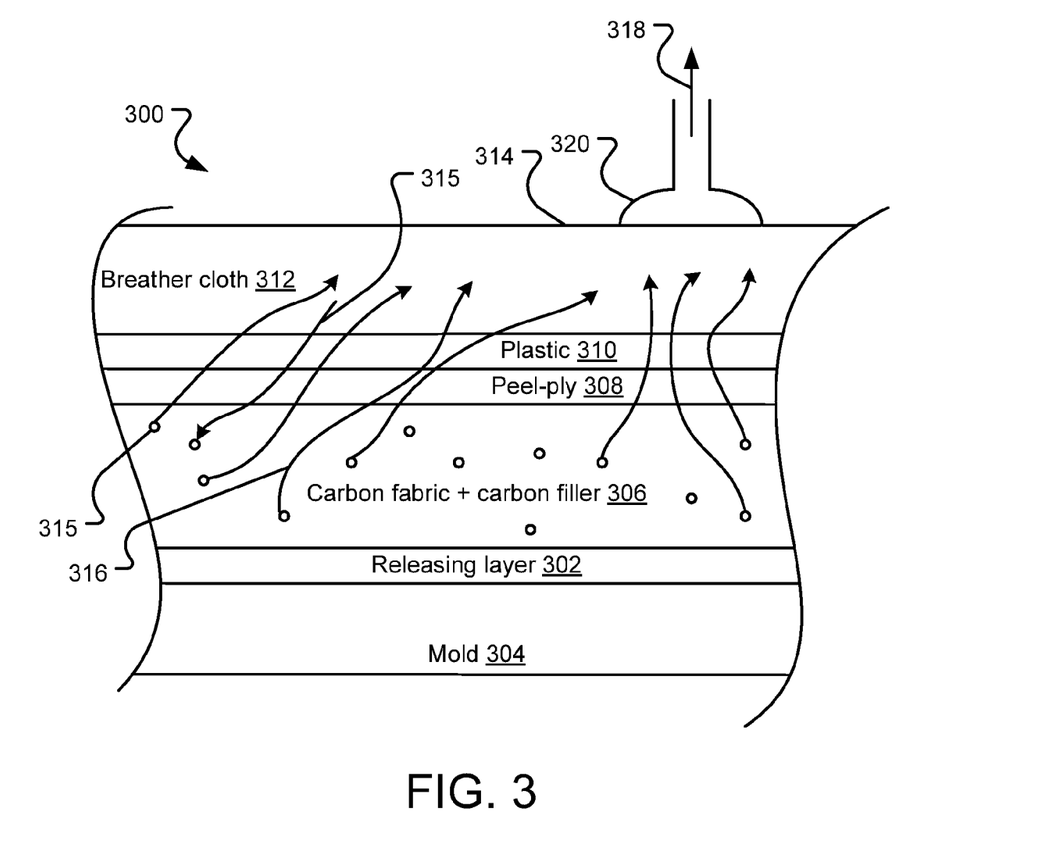
FIG. 3 illustrates an example C/C lay-up undergoing a first curing operation to make a C/C product.
Figure 4:
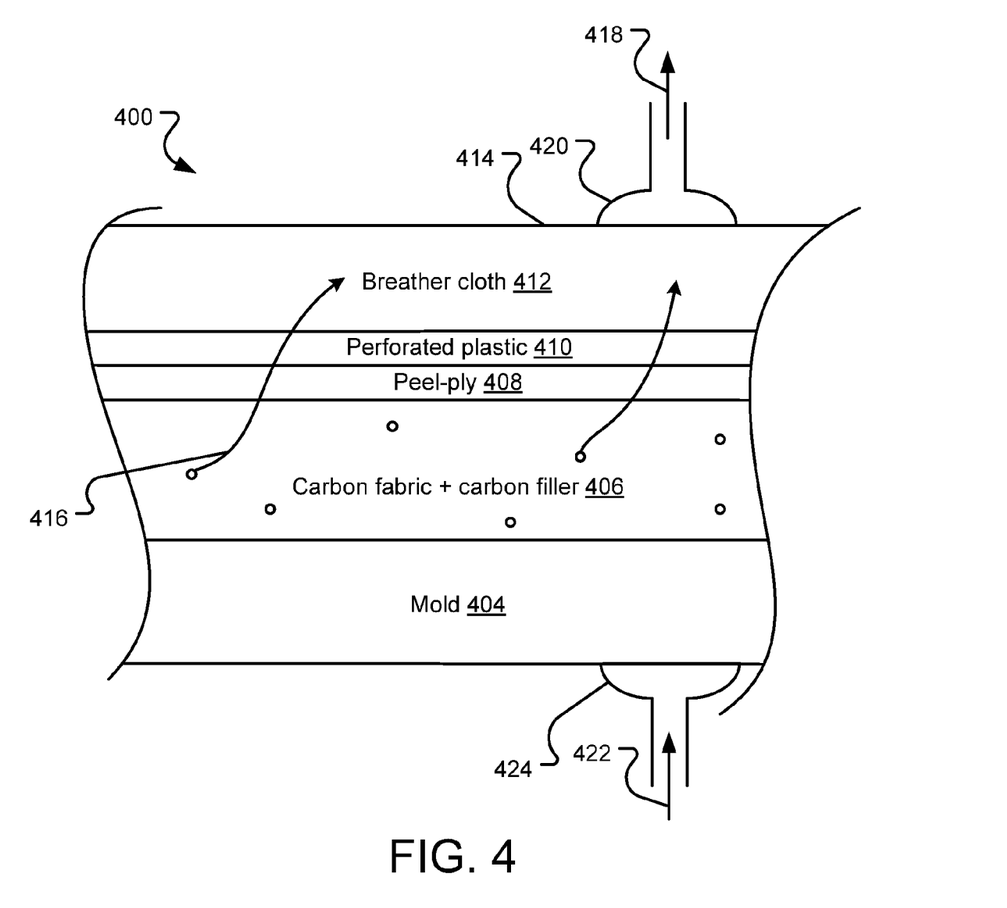
FIG. 4 illustrates an example C/C lay-up undergoing a second curing operation to make a C/C product.

FIG. 2 illustrates example operations 200 for making a C/C product using a C/C lay-up (e.g., the C/C lay-ups depicted in FIGS. 3 and 4). The C/C product may be used in implementations where a relatively low weight and a high resistance to thermal loading properties is desirable (e.g., a thruster nozzle). A first curing operation 210 cures a C/C vacuum-sealed lay-up at a first curing temperature (e.g., 100-160° C. or about 130° C.) for a first period of time (e.g., 2-6 hours or about 4 hours).

The C/C vacuum-sealed lay-up may be constructed as discussed above with regard to FIG. 1 or using another or a modified process. Generally, the first curing temperature vaporizes the entraining liquid of the C/C lay-up. Further, the first period of time is sufficient to vaporize a substantial majority of the entraining liquid of the volatile carbon-entrained filler within the lay-up at the first curing temperature. For example, the first curing operation 210 may vaporize greater than 90%, or in some implementations greater than 99%, or the entraining liquid of the carbon-entrained filler. This generates gasses that are pulled toward and into a breather cloth layer within the lay-up by the vacuum pressure and pumped out of the lay-up via a vacuum pump, for example. This process is referred to herein as outgassing. In one implementation, a vacuum bag in used to apply sufficient pressure (e.g., less than 14.7 psia, or less than 5 psia, or less than 1 psia) to displace volume evacuated by the evaporating entraining liquid with excess carbon powder material so that pore spaces between the carbon fibers are filled with the carbon powder as the entraining liquid evaporates. The vacuum seal may also help to prevent thermal warping of the lay-up during curing. The first curing temperature may also cure or partially cure phenolic resin within the lay-up, which provides a weak bond between the carbon powder within the carbon-entrained filler and the carbon fabric. The first curing temperature may also, in conjunction with the vacuum pressure, begin weak bonding of the carbon powder within the carbon-entrained filler with the carbon fabric. However, the first curing temperature may be insufficient to decompose, combust, or otherwise significantly damage the releasing layer.

In one implementation, the vapor pressure of the entraining liquid at the first curing temperature is not excessively high (e.g., greater than about 5 MPa), which otherwise could cause aggressive boiling of the entraining liquid and create gas-filled pockets in the C/C lay-up as the phenolic resin cures. Further, the first curing temperature can be ramped up slowly in order to control the rate of boiling of the entraining liquid. Furthermore, the mold may be heated in order to produce a temperature gradient across the C/C lay-up to preferentially boil-off entraining fluid from the inside surface towards the outside surface of the C/C lay-up, where the boiled-off gases are allowed to escape through the perforated plastic film. Further, the first curing temperature and duration is selected such that a desired volatile vaporization percentage is achieved (e.g., greater than 90% or 99%) prior to the phenolic resin curing and trapping vaporized fluid within the C/C lay-up, which can result in closed-cell porosity. In various implementations, acceptable closed-cell porosity within the C/C lay-up is less than 5% or 1% of the total C/C lay-up volume.

A cooling operation 220 allows the C/C vacuum-sealed lay-up to cool to a temperature where it may be handled without causing damage to the C/C lay-up (e.g., cooled to less than about 65° C.). A removing operation 230 removes the impermeable releasing layer from the C/C lay-up. The removing operation 230 may include releasing the vacuum-seal, taking the C/C structure out of the mold, removing the impermeable releasing layer from the mold and/or C/C structure, placing the C/C structure back into the mold without the impermeable releasing layer, and re-applying a vacuum-seal to the C/C structure. In some implementations, the removing operation 230 includes applying a positive pressure at the underside of the mold on the impermeable releasing layer to assist removal of the C/C structure from the mold. In other implementations, the removing operation 230 includes involve twisting the C/C structure on the mold to apply shear stress between the mold and C/C structure to release the C/C structure from the mold. In yet other implementations, the removing operation 230 includes inserting a mechanical wedge between the C/C structure and the mold to separate the edges of the C/C structure from the mold and peel the C/C structure from the mold.

The specific methods used for removing operation 230 may depend on the draft angle of the C/C structure and the corresponding mold. For example, low draft angle C/C structures and molds may require mechanical wedges, supplemental pressure, and/or other techniques to consistently separate the C/C structure from the mold. High draft angle C/C structures and molds may not require such supplementary techniques. Further, the quantity of binder material (e.g., phenolic resin) may vary based on the draft angle of the C/C structure and the corresponding mold. More specifically, more binder material may be used when the C/C structure and mold has a low draft angle to help maintain the structural integrity of the C/C structure when it is removed from the mold. High draft angle C/C structures and molds may require less binder material to maintain the structural integrity of the C/C structure when it is removed from the mold.

A second curing operation 240 cures the C/C lay-up at a second curing temperature (e.g., 200-300° C. or about 260° C.) for a second period of time (e.g., 1-3 hours or about 2 hours). The second curing operation 240 may occur under vacuum conditions, which promote diffusion bonding of the carbon powder to the carbon fabric. The second curing temperature may exceed a diffusion bonding temperature of the carbon powder and the second period of time is sufficient to substantially diffusion bond the carbon powder with the carbon fabric and with itself. In various implementations, the second curing operation 240 diffusion bonds greater than 90% (or greater than 99%) of the carbon powder in the C/C lay-up and results in a C/C layup with less than 10% (or less than 1%) porosity. In some applications, the carbon powder may only be weakly bond through a combination of diffusion bonding and/or interactions with the cured phenolic resin. The weak diffusion bonding may occur due to residual gasses released in cure from the original entraining fluid. The degree and type of carbon bonding after the second curing operation 240 may determine whether a much higher temperature third curing operation (see operation 245) is necessary in order to complete the diffusion bonding of the carbon powder and carbon fabric within the C/C structure.

Vacuum sealing and withdrawing gases from the C/C structure during this second curing operation 240 may aid in the diffusion bonding between the carbon powder and the carbon fabric. Some limited final out-gassing may also occur during the second curing operation 240. Further, limited residual gasses (e.g., hydrogen) that are outgassed during the second curing operation 240 may also act as a catalyst for C/C bonding during the second curing operation 240. During the second curing operation 240, if the entraining liquid includes phenolic resin, the phenolic resin may undergo pyrolysis to become pure or nearly pure carbon. Further, the carbon-carbon diffusion bonding process may be accelerated with application of a vacuum (see discussion above) to remove interstitial pore gases. The vacuum may also permit the second curing operation 240 to be performed at lower temperatures than normally would be possible under atmospheric or higher-pressure conditions.

A third curing operation 245 cures the C/C lay-up at a third curing temperature (e.g., a temperature substantially greater than 300° C.) for a second period of time (e.g., 1-3 hours or about 2 hours). In one implementation, the third curing operation utilizes a carbon vapor deposition process to substantially fill any remaining porosity of the C/C lay-up with carbon. In various implementations, the third curing operation 245 creates a C/C layup with less than 1% or less than 0.1% porosity. In some implementations, the second curing operation 240 creates a C/C layup with an acceptable porosity and the third curing operation 245 is not be used.

The releasing layer prevents the C/C structure from substantially adhering to the mold during the first curing operation 210. However, the releasing layer will typically not withstand the higher temperature second curing operation 240 and thus the releasing layer is removed prior to the second curing operation 240. In other implementations, the releasing layer is not removed and allowed to decompose, combust or otherwise degrade during the second curing operation 240. In yet other implementations, the releasing layer is not removed because it is capable of withstanding the second curing operation 240 without substantial degradation.

In one implementation, the first curing operation 210 vaporizes sufficient entraining liquid out of carbon-entrained filler so that the C/C structure does not adhere to the mold during the second curing operation 240. This prevents C/C structure from adhering to the mold if the releasing layer is removed prior to the second curing operation 240 or if the releasing layer degrades as a result of the second curing operation 240. In some implementations, the C/C structure is not placed back into a vacuum seal after the removing operation 230. Since the majority of the outgassing is accomplished during the first curing operation 210, the vacuum seal may not be necessary or desired during the second curing operation 240.

The product resulting from operations 200 is a C/C structure that is not porous as typical in C/C structures that utilize pyrolysis of carbon-enriched epoxies rather than the presently disclosed carbon filler to bond with carbon fabric. As a result, no post-curing processes to fill gaps in the C/C structure are necessary. This decreases the time and cost required to manufacture the C/C structure as compared to traditional C/C structures. Further, the C/C structure resulting from operations 200 may be more flexible than C/C structures that utilize carbon epoxies to bond with the carbon fabric.

An adding operation 250 adds an oxidation-resistant coating to the C/C product. The oxidation resistant coating helps prevent degradation of the C/C product when it is exposed to oxygen-rich environments (e.g., air and water). Further, if the C/C product is to be used in high-temperature conditions, the oxidation-resistant coating should be capable of withstanding similarly high temperatures. Example high-temperature oxidation resistant coatings include iridium, rhenium, iridium-rhenium eutectics, iridium carbide, rhenium carbide, silicon carbide, and other refractory metal carbides.

FIG. 3 illustrates an example C/C lay-up 300 undergoing a first curing operation (see e.g., curing operation 210 of FIG. 2) to make a C/C product. The C/C lay-up 300 includes a releasing layer 302 applied to a mold 304. A matrix of one or more layers of carbon fabric and carbon-entrained filler material (layer 306) is applied to the mold 304 on top of the releasing layer 302. Peel-ply 308, perforated plastic 310, and breather cloth 312 are applied over the carbon fabric and carbon-entrained filler material layer 306. The C/C lay-up 300 is then placed within a vacuum bag 314 prior to the first curing operation.

During the first curing operation, a majority of the liquid within the carbon-entrained filler material outgasses out of the filler material (see e.g., bubble 315) and permeates through the peel-ply 308 and the perforated plastic 310 and is deposited within the breather cloth 312 (see e.g., as illustrated by arrow 316). Further, in some implementations, a constant vacuum (illustrated by arrow 318) is applied to the C/C lay-up 300 via a fitting 320 on the vacuum bag 314. The gasified filler material may further permeate through the breather cloth 312 and exit the C/C layup 300 via the fitting 320.

As the first curing operation proceeds, the carbon fabric/filler layer 306 densifies, becoming mostly carbon fabric, powdered carbon filler, and a weak binder that may be pyrolyzed into pure carbon at temperatures experienced during a second curing operation (see e.g., operation 240 of FIG. 2). Further, some of the excess carbon-entrained filler material absorbed by the breather cloth 312 may be drawn back out of the breather cloth 312 to fill any voids vacated by the outgassing filler material (see e.g., arrow 315). There may also be some residual catalyst and liquid components of the carbon-entrained filler material that do not vaporize during the first curing operation. Further, the first curing operation temperature is not high enough to substantially bind the carbon powder to the carbon fabric. After the first curing operation, the C/C lay-up 300 may be referred to as green-cured.

FIG. 4 illustrates an example C/C lay-up 400 undergoing a second curing operation (see e.g., operation 240 of FIG. 2) to make a C/C product. After a first curing operation (see e.g., operation 210 of FIG. 2), the C/C lay-up 400 may be removed from a mold 404 and a releasing layer (not shown, see releasing layer 302 of FIG. 3)) may be removed from the lay-up 400. In some implementations, positive pressure (illustrated by arrow 422) is applied through the mold 404 to the underside of the C/C lay-up 400 via a fitting 424. This may assist removing the C/C lay-up 400 from the mold 404. In other implementations, the C/C lay-up 400 may be removed from the mold 404 by twisting the C/C lay-up 400 relative to the mold 404 in order to apply shear stress between the mold 404 and C/C lay-up 400. In yet other implementations, a mechanical wedge is inserted between the C/C lay-up 400 and the mold 404 and used to separate the edges of the C/C lay-up 400 from the mold 404 and peel the C/C lay-up 400 from the mold 404. In some implementations, the releasing layer is not removed and pyrolysis decomposes the releasing layer during the second curing operation.

The C/C lay-up 400 includes a substantially outgassed (or green-cured) matrix of one or more layers of carbon fabric and carbon-entrained filler material (layer 406) applied over the mold 404. Peel-ply 408, perforated plastic 410, and breather cloth 412 are applied over the carbon fabric/filler layer 406. The C/C lay-up 400 is placed within a vacuum bag 414 prior to the second, higher-temperature curing operation. In some implementations, a constant vacuum (illustrated by arrow 418) is applied to the C/C lay-up 400 via a fitting 420 on the vacuum bag 414. The green-cured carbon fabric/filler layer 406 is mostly outgassed with primarily carbon powder material, very small amounts of liquid, and a weak binder remaining.

During the second curing operation, any remaining liquid within the fabric/filler layer 406 outgasses, permeates through the peel-ply 408 and the perforated plastic 410, and is deposited within the breather cloth 412 (see e.g., arrow 416). In some implementations, the remaining gasified liquid filler material may further permeate through the breather cloth 412 and exit the C/C layup 400 via the fitting 420. The second curing operation binds the carbon powder to the carbon fabric creating a strong bonded C/C product without significant porosity. After the second curing operation, the C/C lay-up 400 may be referred to as fully-cured.

It should be understood that logical operations steps recited herein may be performed in any order, may omit certain operations, and/or may add operations unless explicitly claimed otherwise or the claim language inherently necessitates a specific order. The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of manufacturing a carbon-on-carbon (C/C) composite, the method comprising:
   curing a C/C lay-up comprising carbon-fabric, carbon power and polymeric binder within a mold under vacuum at a first curing temperature in a range from about 100° C. to about 160° C.;
   releasing the C/C lay-up from the mold after curing at the first curing temperature; and
   curing the C/C lay-up at a second curing temperature in a range from about 200° C. to about 300° C. responsive to the releasing operation, to substantially bond the carbon powder to the carbon-fabric and pyrolyze polymeric binder.

2. The method of claim 1, wherein the first curing temperature substantially gasifies a carbon-entrained filler within the C/C lay-up.

3. The method of claim 1, wherein the releasing operation includes removing a releasing layer that provides a barrier between the C/C lay-up and the mold.

4. The method of claim 3, wherein the releasing layer does not undergo substantial chemical changes at the first curing temperature.

5. The method of claim 1, further comprising:
cooling the C/C lay-up prior to the releasing operation and responsive to curing the C/C lay-up at the first curing temperature.

6. The method of claim 1, further comprising:
applying an oxidation-resistant high-temperature coating to the C/C lay-up responsive to curing the C/C lay-up at the second curing temperature.

7. The method of claim 1, wherein a duration of curing the C/C lay-up at the first curing temperature ranges from about 2 hours to about 6 hours and a duration of curing the C/C lay-up at the second curing temperature ranges from about 1 hour to about 3 hours.

8. The method of claim 1, further comprising:
curing the C/C lay-up at a third curing temperature using carbon vapor deposition responsive to curing the C/C lay-up at the second curing temperature, wherein the third curing temperature is higher than the second curing temperature.

9. The method of claim 1, wherein the curing of the C/C lay-up at the first curing temperature gasifies greater than 99% of a liquid-component of the C/C lay-up and achieves closed-cell porosity within the C/C lay-up less than 5% of the total C/C lay-up volume.

10. The method of claim 1, wherein curing the C/C lay-up at the second curing temperature comprises curing the C/C lay-up at the second curing temperature under vacuum.

11. The method of claim 1, further comprising curing the C/C lay-up at a third curing temperature greater than about 300° C. after curing the C/C lay-up at the second curing temperature.

12. A method of manufacturing a carbon-on-carbon (C/C) composite, the method comprising:
providing a C/C lay-up comprising carbon fabric and carbon-entrained filler comprising carbon powder and polymeric binder;
curing the C/C lay-up within a mold under vacuum at a first curing temperature to substantially gasify the carbon-entrained filler;
releasing the C/C lay-up from the mold after curing at the first curing temperature; and
after releasing the C/C lay-up from the mold, curing the C/C lay-up at a second curing temperature in a range from about 200° C. to about 300° C. to substantially bond the carbon powder to the carbon-fabric and pyrolyze the polymeric binder, wherein the second curing temperature is higher than the first curing temperature.

13. The method of claim 12, wherein the releasing operation includes removing a releasing layer that provides a barrier between the C/C lay-up and the mold.

14. The method of claim 12, further comprising:
cooling the C/C lay-up prior to the releasing operation and responsive to curing the C/C lay-up at the first curing temperature.

15. The method of claim 12, wherein the first curing temperature ranges from about 100° C. to about 160° C.

16. A method of manufacturing a carbon-on-carbon (C/C) composite, the method comprising:
providing a C/C lay-up comprising carbon fabric, polymeric binder, and liquid-entrained carbon powder in a mold;
gasifying and outgassing the liquid from the molded C/C lay-up under vacuum at a first temperature less than 315° C.;
releasing the C/C lay-up from the mold after outgassing; and
after releasing the C/C lay-up from the mold, curing the C/C lay-up at a curing temperature in a range from about 200° C. to about 300° C. to substantially bond the carbon powder to the carbon fabric and pyrolyze the polymeric binder.

17. The method of claim 16, wherein:
the polymeric binder does not pyrolyze during the gasifying and outgassing step.

* * * * *